US009567959B2

United States Patent
Takimoto et al.

(10) Patent No.: US 9,567,959 B2
(45) Date of Patent: Feb. 14, 2017

(54) CONNECTOR (71) Applicant: TOKAI RUBBER INDUSTRIES, LTD., Aichi (JP)

(72) Inventors: Yorihiro Takimoto, Aichi (JP); Ryo Ikegami, Aichi (JP); Koji Mizutani, Aichi (JP); Kazutaka Katayama, Aichi (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 295 days.

(21) Appl. No.: 14/298,183

(22) Filed: Jun. 6, 2014

(65) Prior Publication Data

US 2014/0283678 A1    Sep. 25, 2014

Related U.S. Application Data (63) Continuation of application No. PCT/JP2013/072816, filed on Aug. 27, 2013.

(30) Foreign Application Priority Data

Sep. 5, 2012  (JP) .................................. 2012-194992

(51) Int. Cl.
*F02M 55/02*     (2006.01)
*F16L 55/04*     (2006.01)
(Continued)

(52) U.S. Cl.
CPC ......... *F02M 55/02* (2013.01); *F02M 37/0041* (2013.01); *F02M 55/04* (2013.01);
(Continued)

(58) Field of Classification Search
CPC ...... F02M 55/02; F02M 55/04; F02M 37/041; F16L 55/04
(Continued)

(56) References Cited

U.S. PATENT DOCUMENTS

| 5,727,529 A * | 3/1998 | Tuckey ................. F02D 33/003 123/497 |
| 7,063,200 B2 * | 6/2006 | Takahashi ............... F15B 1/021 192/109 F |
| 2004/0178038 A1 | 9/2004 | Takahashi |

FOREIGN PATENT DOCUMENTS

| DE | 19528737 | 11/1996 |
| JP | 2011-163154 | 8/2011 |
| JP | 2011163154 A * | 8/2011 |

OTHER PUBLICATIONS

Search Report issued by E.P.O. patent office in E.P.O. Patent Application No. 13835694.4, dated Nov. 25, 2015.

(Continued)

*Primary Examiner* — Thomas E Lazo (74) *Attorney, Agent, or Firm* — Greenblum & Bernstein, P.L.C.

(57) ABSTRACT

Provided is a connector which can facilitate tuning of frequency of pulsation to be reduced and prevent sealing performance from degrading when a piston moves. A pulsation reducing member adopts a structure in which the piston moves in a cylinder. The cylinder has an annular flange portion projecting in a radially inner direction of a hollow cylindrical shape. An elastic sealing member is sandwiched in a compressed state between an end surface of the flange portion of the cylinder and an end surface of the piston. An urging body is disposed in a region in the cylinder on a side of the piston opposite to a passage and applies urging force to move the piston toward the passage and compress the elastic sealing member.

6 Claims, 7 Drawing Sheets

(51) Int. Cl.
  *F02M 55/04*  (2006.01)
  *F02M 69/46*  (2006.01)
  *F02M 37/00*  (2006.01)
  *F16L 37/084*  (2006.01)
  *F16L 55/053*  (2006.01)

(52) U.S. Cl.
  CPC ....... *F02M 69/462* (2013.01); *F16L 37/0847* (2013.01); *F16L 55/04* (2013.01); *F16L 55/053* (2013.01); *F02M 2200/315* (2013.01); *F02M 2200/9015* (2013.01)

(58) Field of Classification Search
  USPC .......................................................... 92/143
  See application file for complete search history.

(56) References Cited

OTHER PUBLICATIONS

Search report from PCT/JP2013/072816, mail date is Oct. 29, 2013.

\* cited by examiner

CONNECTOR

CROSS-REFERENCE TO RELATED APPLICATION

This is a continuation of Application PCT/JP2013/072816, filed on Aug. 27, 2013, which is incorporated herein by reference.

The present invention is based on Japanese Patent Application No. 2012-194992, filed on Sep. 5, 2012, the entire contents of which are incorporated herein by reference.

BACKGROUND OF THE INVENTION

1. Field of the Invention

The present invention relates to a connector in a piping system and more particularly to a connector capable of reducing pulsation of fluid in conveying the fluid.

2. Description of the Related Art

For example, in a piping system for a fuel supply system of an automobile, a connector connects a hose for conveying pressurized fuel from a pump, and a fuel delivery pipe for delivering and distributing the fuel to a plurality of injectors. In such a piping system, fuel transfer is achieved by applying pressure to fuel in the hose by a pump so as to keep the pressure at a predetermined constant value. If injection apparatus such as injectors is opened or closed for fuel supply control while the piping system is placed under such a condition, pressure in the piping system changes and the fuel pulsates, as is well known. If the fuel pulsates, fuel pressure in the injection apparatus may become too high or too low and the amount of fuel to be injected by the injection apparatus may deviate from a desired amount.

Under these circumstances, a variety of techniques have been proposed to reduce pulsation. For example, in a connector mentioned in JP-A-2011-163154 (PTL 1), a cylinder is integrally formed with a housing of the connector and an O ring is provided on an outer circumferential portion of a piston so as to be in slidable contact with an inner circumferential surface of the cylinder. The piston and the O ring liquid-tightly divide a fuel chamber which communicates with a fuel passage and an air chamber which holds the air. When pressure variation is small at an initial stage of pulsation, this connector reduces the pressure variation by sliding resistance between the O ring and the inner circumferential surface of the cylinder. When a pressure variation which cannot be reduced by the sliding resistance occurs, the pressure variation is reduced by the air in the air chamber.

CITATION LIST

Patent Literature

[PTL 1] JP-A-2011-163154

SUMMARY OF INVENTION

In the aforementioned connector, the O ring contacts the inner circumferential surface of the cylinder in a radially compressed state in order to ensure sealing performance. Since the O ring in such a compressed state slides against the inner circumferential surface of the cylinder, sliding resistance of the O ring may change due to aged deterioration. If sliding resistance of the O ring changes, power to reduce pulsation will change and a desired pulsation reducing effect may be unable to be exhibited. For example, even if tuning is initially performed so as to reduce a desired frequency range of pulsation, a frequency range of pulsation which can be reduced may change after aged deterioration and as a result there is a risk that the desired frequency range of pulsation cannot be reduced. Therefore, the aforementioned connector is not easy to time frequency of pulsation to be reduced. Furthermore, since the aforementioned connector is constructed to slide the O ring, sealing performance of the O ring may degrade.

The present invention has been made in view of these circumstances. It is an object of the present invention to provide a connector employing a structure in which pulsation is reduced by piston movement and capable of facilitating tuning of frequency of pulsation to be reduced and preventing sealing performance from degrading due to piston movement.

A connector according to the present solution is designed such that an elastic sealing member disposed between a cylinder and a piston is sandwiched in a compressed state by an end surface of the cylinder and an end surface of the piston. That is to say, the elastic sealing member is designed to have only a sealing function and not to apply force in a direction to reduce pulsation, and an urging body is designed to apply force in a direction to reduce pulsation. Thus, a member having a sealing function is separated from a member having a pulsation reducing function.

That is to say, the connector according to the present solution comprises a housing which forms a passage for conveying fluid from one end to the other end thereof and connecting a first member on a side of the one end with a second member on a side of the other end, and a pulsation reducing member provided on the housing. The pulsation reducing member comprises: a cylinder formed in a hollow cylindrical shape integrally with the housing, having an opening portion on one end side of the hollow cylindrical shape communicating with the passage, and having an annular flange portion projecting in a radially inner direction of the hollow cylindrical shape; a piston disposed in the cylinder on a side of the flange portion opposite to the passage and movable in the cylinder; an elastic sealing member sandwiched in a compressed state between an end surface of the flange portion and an end surface of the piston, dividing a region on a side of the piston near the passage from a region on a side of the piston opposite to the passage in the cylinder, and changing in the amount of compression in accordance with position of the piston; and an urging body disposed in the region on the side of the piston opposite to the passage in the cylinder and applying urging force to move the piston toward the passage and compress the elastic sealing member.

As mentioned above, fluid pulsation can be reduced by causing the urging body to apply urging force to the piston. Besides, with piston movement, the amount of compression of the elastic sealing member changes, but the elastic sealing member does not slide against the cylinder. Therefore, in the aforementioned connector, sealing performance can be prevented from degrading due to sliding of the elastic sealing member.

Furthermore, since the elastic sealing member does not slide against the cylinder, the elastic sealing member is free from aged deterioration due to sliding. Therefore, frequency of pulsation to be reduced can be prevented from being changed by aged deterioration of the elastic sealing member due to the sliding. Furthermore, the elastic sealing member does not apply force to urge the piston toward the passage. The elastic sealing member urges the piston in an opposite direction to the passage. That is to say, while urging force of the urging body contributes to a reduction in pulsation, elastic force of the elastic sealing member does not contribute to the reduction in pulsation. Therefore, tuning of the frequency of pulsation to be reduced is affected by the urging body, but not by the elastic sealing member. As a result, it is easy to tune frequency of pulsation to be reduced.

PREFERRED ASPECTS

Preferred aspects of the connector according to the present solution will be described below.

Preferably, the urging body comprises an elastic member which is any of a coil spring, a flat spring, elastic resin and rubber attached between the other end surface of the piston and a surface on the other end side of the cylinder. Use of such an elastic member ensures a reduction in pulsation. For example, since a coil spring, a flat spring, and elastic resin have high moduli of repulsion elasticity, pulsation can be reduced by repulsion force to the piston. On the other hand, rubber, which is a viscoelastic body, can absorb displacement energy of the piston by its viscous component, and as a result can reduce pulsation.

In addition, in one aspect, the cylinder has an opening portion on the other end side of the hollow cylindrical shape, and the region in the cylinder on the side of the piston opposite to the passage is open to the atmosphere. This facilitates designing. Moreover, the atmosphere present on the side of the piston opposite to the passage does not generate force to urge the piston toward the passage. Therefore, upon employing only the aforementioned elastic member as the urging body, frequency of pulsation to be reduced can be tuned with ease.

Furthermore, in another aspect, the cylinder has a closed bottom surface on the other end side of the hollow cylindrical shape; the cylinder, the piston and the elastic sealing member form a sealed chamber in the region in the cylinder on the side of the piston opposite to the passage; and the urging body comprises gas in the sealed chamber in addition to the elastic member. In this case, the urging body is the elastic member and the gas in the sealed chamber. Upon making the region on the side of the piston opposite to the passage into a sealed member, fluid can be prevented from leaking outside even if passed through the sealing member. In this way, the connector can have a fail-safe function against fluid leakage.

Moreover, in still another aspect, the cylinder has a closed bottom surface on the other end side of the hollow cylindrical shape; the cylinder, the piston and the elastic sealing member form a sealed chamber in the region in the cylinder on the side of the piston opposite to the passage; and the urging body is gas in the sealed chamber. In this case, the gas in the sealed chamber applies force to urge the piston. Herein, the gas has a similar effect to that of the viscoelastic body. It is suitable to use the air as the gas.

DESCRIPTION OF THE PREFERRED EMBODIMENTS

Example 1

In a fuel supply system of an automobile, a connector 1 of this example connects a hose 2 for conveying fluid fuel pumped from a fuel tank with a fuel delivery pipe 3 for delivering and distributing the supplied fluid fuel to injectors. A desired amount of fluid fuel is injected into cylinders of an engine by control of an open or closed state of each of the injectors.

That is to say, the connector 1 forms a passage 12 for conveying fluid fuel from one end to the other end thereof, and one end of the hose 2 as a first member is attached to the one end of the connector 1, while one end of the pipe 3 as a second member is attached to the other end of the connector 1. In this way, the connector 1 conveys fluid fuel from the side of the hose 2 side to the side of the pipe 3.

Opening or closing operations of the injectors cause pulsation to fluid fuel which passes through the hose 2, the connector 1, and the pipe 3. When the hose 2 is formed of rubber, the hose 2 exhibits a pulsation reducing effect, but when the hose 2 is formed of resin, the hose 2 cannot produce the pulsation reducing effect. The connector 1 of this example can effectively reduce pulsation when a hose formed of resin is employed as the hose 2. However, the connector 1 of this example can also be applied when a hose formed of rubber is employed as the hose 2.

The connector 1 of this example is described here by taking an example of a quick connector, but the present invention is not limited to the quick connector and can be applied to a simple type connector. Hereinafter, details of the connector 1 will be described.

Figure 1:
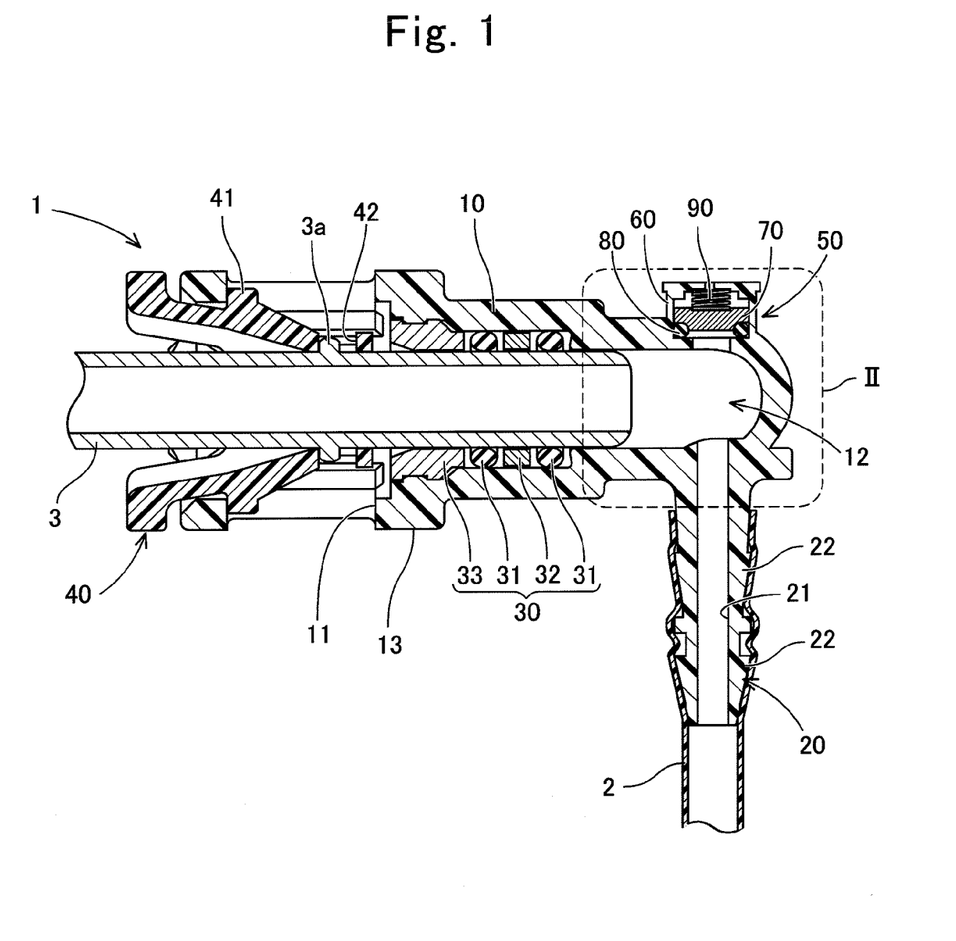
FIG. 1 is a longitudinal sectional view of a connector of Example 1 of the present invention.

The connector 1 of this example is an elbow type connector as shown in FIG. 1. The connector 1 comprises a housing 10, a hose connecting portion 20, a sealing member 30, an engaging member 40 and a pulsation reducing member 50. The housing 10 is formed of resin (e.g., polyamide (PA)), and formed in a hollow cylindrical shape. The pipe 3 is inserted into the housing 10 from an end opening of the housing 10. The housing 10 is formed to have window portions 11, 11 which penetrate the housing 10 in a radial direction and are opposed to each other. On an end side of the pipe 3, an annular projection 3a which projects in a centrifugal direction is formed at a position at some distance from an end surface. The annular projection 3a is inserted in the housing 10.

The hose connecting portion 20 is integrally formed with the housing 10 on an opposite side of the housing 10 to the end opening. The housing 10 and the hose connecting portion 20 form an L shape (an elbow type). The hose connecting portion 20 is formed to have an axial through hole 21 on its inner circumferential surface, and a plurality of axially-arranged sharp annular projections 22, 22 on its outer circumferential surface. The hose 2 is press-fitted on the outer circumferential surface of the hose connecting portion 20, and prevented from slipping off by the sharp annular projections 22, 22. It is possible to fit an O ring or the like appropriately between neighboring two of the sharp annular projections so as to seal a gap between the hose 2 and the hose connecting portion 20.

The sealing member 30 is disposed in a radial gap between the inner circumferential surface of the housing 10 and the outer circumferential surface of the pipe 3. The sealing member 30 is constituted by a pair of O rings 31, 31 for sealing a gap between the inner circumferential surface of the housing 10 and the outer circumferential surface of the end portion of the pipe 3, a cylindrical collar member 32 disposed between the pair of O rings 31, 31, and a cylindrical bush 33 disposed on the end opening side of the housing 10 and axially closing the radial gap.

The engaging member 40 is formed of an elastically deformable resin (e.g., polyamide (PA)), and formed in a radially cross sectional shape of C, and has a relatively large gap for deformation between both circumferential ends of the C shape. A pair of engaging claws 41 are formed on the outer circumferential surface of the engaging member 40 so as to project radially outward. The engaging claws 41 are inserted from the end opening of the housing 10 and engaged with the window portions 11, 11 of the housing 10. In this way, the engaging member 40 is restricted from slipping off from the housing 10.

Furthermore, slits 42 into which the annular projection 3a of the pipe 3 is inserted in connecting the pipe 3 with the housing 10 are formed on the engaging member 40 so as to be opposed to each other. That is to say, if the pipe 3 is inserted into the housing 10 with the engaging member 40 inserted in and held by the housing 10, the annular projection 3a of the pipe 3 is engaged with the slits 42 and this restricts the pipe 3 from slipping off from the housing 10 and the engaging member 40. It is to be noted that the pipe 3 and the engaging member 40 can be removed from the housing 10 by reducing the diameter of the engaging member 40.

When the pipe 3 is attached to the housing 10 by way of the engaging member 40 and the hose 2 is attached to the hose connecting portion 20 as mentioned above, an L-shaped passage 12 is formed from the side of the hose 2 to the side of the pipe 3.

Figure 2:
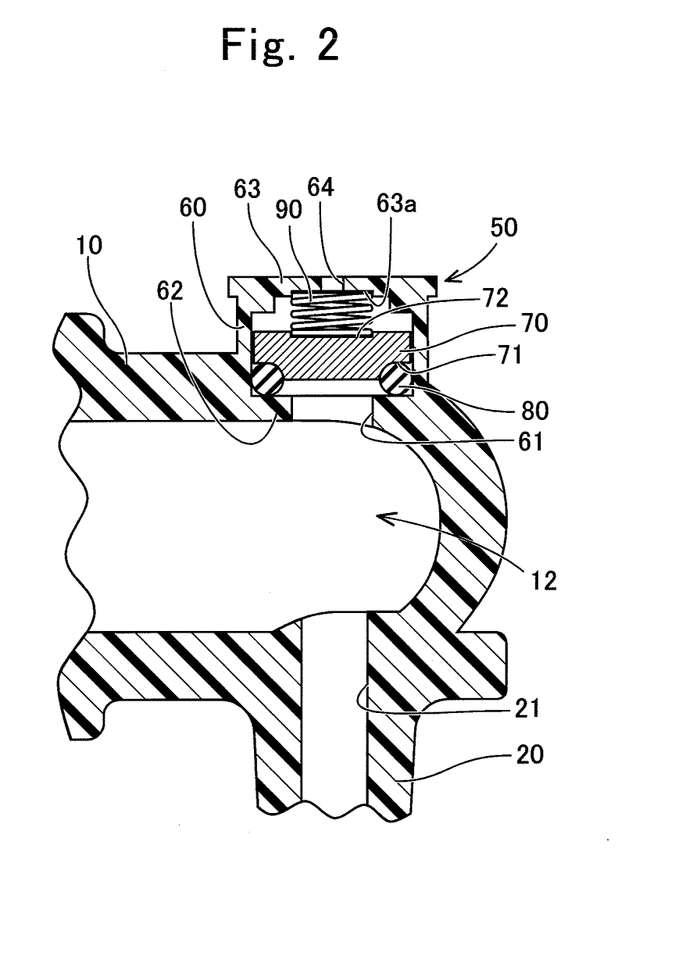
FIG. 2 is an enlarged view of a portion II in FIG. 1.

As shown in FIGS. 1 and 2, the pulsation reducing member 50 is provided on the side of the housing 10 near the hose connecting portion 20. The pulsation reducing member 50 comprises a cylinder 60, a piston 70, an elastic sealing member 80 and an urging elastic member 90.

The cylinder 60 is formed in a hollow cylindrical shape and integrally provided on the side of the housing 10 near the hose connecting portion 20. In this example, an axial direction of the hollow cylindrical shape of the cylinder 60 is aligned with the axial hole 21 of the hose connecting portion 20. Although the cylinder 60 is integrally molded with the housing 60 in this example, the cylinder 60 can be molded independently of the housing 10 and then joined integrally to the housing 10.

An opening portion 61 is formed on one end side (the lower side of FIGS. 1 and 2) of the hollow cylindrical shape of the cylinder 60. This opening portion 61 communicates with the passage 12 of the housing 10. Hereinafter, this opening portion 61 will be called the passage side opening portion. The passage side opening portion 61 has a smaller inner diameter than an inner diameter of a center portion of the cylinder 60. That is to say, an annular flange portion 62 projecting in a radially inner direction of the hollow cylindrical shape of the cylinder 60 is formed on a portion which forms the passage side opening portion 61. On the other hand, an opening portion 64 is formed on a bottom portion 63 of the opposite end side (the upper side of FIGS. 1 and 2) of the hollow cylindrical shape of the cylinder 60. Hereinafter, this opening portion 64 will be called "the bottom side opening portion". An inner end surface of the bottom portion 63 is formed in a stepped shape having a recessed portion 63a on its center.

The piston 70 is formed in an approximately disk shape, and housed in the cylinder 60 so as to be movable in the cylinder 60 in an axial direction of the hollow cylindrical shape of the cylinder 60. That is to say, the piston 70 is placed on a side of the flange portion 62 of the cylinder 60 opposite to the passage 12, and on a side of the bottom portion 63 of the cylinder 60 near the passage 12. The piston 70 has a slightly smaller outer diameter than an inner diameter of the cylinder 60.

In addition, a passage side outer peripheral recessed portion 71, which is a cut out in a concave shape all around an outer periphery, is formed on an end surface of the piston 70 on the side of the passage side opening portion 61. This outer peripheral recessed portion 71 faces the flange portion 62 of the cylinder 60. Furthermore, a circular recessed portion 72 is formed at a center portion of an end surface of the piston 70 on the side of the bottom portion 63. This circular recessed portion 72 faces the bottom side opening portion 64.

The elastic sealing member 80 is, for example, an O ring formed of rubber. The elastic sealing member 80 is sandwiched in a compressed state between an end surface of the flange portion 62 of the cylinder 60 and the passage side outer peripheral recessed portion 71 of the piston 70. Upon placed in the passage side outer peripheral recessed portion 71 of the piston 70, the elastic sealing member 80 is prevented from being misaligned from the piston 70. Besides, upon having almost the same outer diameter as the inner diameter of the cylinder 60, the elastic sealing member 80 is prevented from being misaligned from the cylinder 60. Therefore, the elastic sealing member 80 keeps coaxially aligned with the cylinder 60 and the piston 70.

The elastic sealing member 80 placed as mentioned above divides a region on a side of the piston 70 near the passage 12 from a region on a side of the piston 70 opposite to the passage 12 in the cylinder 60 and restricts fluid transfer between these two regions. Through the passage side opening portion 61 of the cylinder 60, fluid fuel is present in the region on the passage 12 side, which is separated by the elastic sealing member 80. On the other hand, the region on the opposite side to the passage 12, which is separated by the elastic sealing member 80, is open to the atmosphere through the bottom side opening portion 64 of the cylinder 60. That is to say, the atmosphere is present in this region.

Herein, the piston 70 can move in the cylinder 60 as mentioned before. Therefore, in whichever position in the cylinder 60 the piston 70 is located, the elastic sealing member 80 seals between the regions without separating from the flange portion 62 or the piston 70. That is to say, the amount of compression of the elastic sealing member 80 changes in accordance with the position of the piston 70. Therefore, the elastic sealing member 80 is formed of a material and shape which enables elastic deformation at least in an amount corresponding to a travel distance of the piston 70. It should be noted that the elastic sealing member 80 can be formed of any material or shape other than the O ring as long as it is formed in an annular shape and elastically deformable.

The urging elastic member 90 is placed in the region on the side of the piston 70 opposite to the passage 12.

Specifically, the urging elastic member 90 is sandwiched between the recessed portion 63a of the bottom portion 63 of the cylinder 60 and the circular recessed portion 72 of the piston 70. This urging elastic member 90 is a coil spring, and one end thereof contacts the recessed portion 63a of the bottom portion 63, while the other end thereof contacts the circular recessed portion 72. That is to say, the urging elastic member 90 imparts force to urge the piston 70 to move toward the passage 12 to the bottom portion 63 of the cylinder 60. Furthermore, this urging force is also force to compress the elastic sealing member 80.

Since both the ends of the urging elastic member 90 are respectively placed in both the recessed portions 63a, 73, the urging elastic member 90 can be prevented from being misaligned from the cylinder 60 or the piston 70. Accordingly, the urging elastic member 90 can impart constantly stable urging force to the piston 70.

Next, an operation of the aforementioned pulsation reducing member 50 will be described. In an initial mode, the elastic sealing member 80 and the urging elastic member 90 are compressed. When fluid fuel passing through the passage 12 in the housing 10 and the hose connecting portion 20 does not pulsate, a total of pressure on fluid fuel and elastic force of the elastic sealing member 80 is kept balanced with urging force of the coil spring as the urging elastic member 90.

When pulsation of fluid fuel is caused by opening and closing operations of the injectors, fluid fuel pressure in the housing 10 changes. When the fluid fuel pressure increases, the pressure moves the piston 70 against the urging force of the urging elastic member 90. Then the urging force of the urging elastic member 90 increases and repulsion force of the urging elastic member 90 pushes back the piston 70 toward the passage 12. In particular, a coil spring has a high modulus of repulsion elasticity. This action reduces the pulsation of fluid fuel.

At this time, the amount of compression of the elastic sealing member 80 decreases from an initial amount when the piston 70 moves toward the bottom portion 63 of the cylinder 60, and increases from the initial amount when the piston 70 moves toward the flange portion 62 of the cylinder 60. During these moves, the elastic sealing member 80 always contacts the end surface of the flange portion 62 and the end surface of the passage side outer peripheral recessed portion 71 of the piston 70. Therefore, fluid fuel does not leak through the elastic sealing member 80 to the bottom portion 63 side of the cylinder 60.

Furthermore, when the piston 70 moves, the elastic sealing member 80 does not slide against the inner circumferential surface of the cylinder 60 because of being sandwiched between the end surfaces. Therefore, sealing performance of the elastic sealing member 80 can be prevented from degrading due to sliding. That is to say, the elastic sealing member 80 can keep a high sealing performance even after used for a long time.

Furthermore, since the elastic sealing member 80 does not slide against the cylinder 60, the elastic sealing member 80 is free from aged deterioration caused by sliding. If the elastic sealing member 80 exhibits a pulsation reducing effect by sliding against the cylinder 60, frequency to reduce pulsation may be affected by degree of aged deterioration of the elastic sealing member 80. In this example, however, since the elastic sealing member 80 is free from aged deterioration caused by sliding, frequency of pulsation to be reduced is prevented from changing.

Furthermore, the direction in which the elastic sealing member 80 urges the piston 70 to move is opposite to the urging direction of the urging elastic member 90. That is to say, the elastic sealing member 80 only has a sealing function and does not exhibit force in a direction to reduce the pulsation, and only the urging elastic member 90 exhibits force in the direction to reduce the pulsation. Therefore, the urging force of the urging elastic member 90 contributes to a reduction in pulsation, but the elastic force of the elastic sealing member 80 does not contribute to the reduction in pulsation. Thus, a member having a sealing function is separated from a member having a pulsation reducing function. As a result, frequency of pulsation to be reduced can be tuned with ease.

Moreover, the region in the cylinder 60 on the side of the piston 70 opposite to the passage 12 is open to the atmosphere. This facilitates designing. Moreover, the atmosphere present on the side of the piston 70 opposite to the passage 12 does not generate force to urge the piston 70 toward the passage 12. Therefore, upon using only the aforementioned urging elastic member 90 as the urging body, frequency of pulsation to be reduced can be tuned with ease.

Example 2

Figure 3:
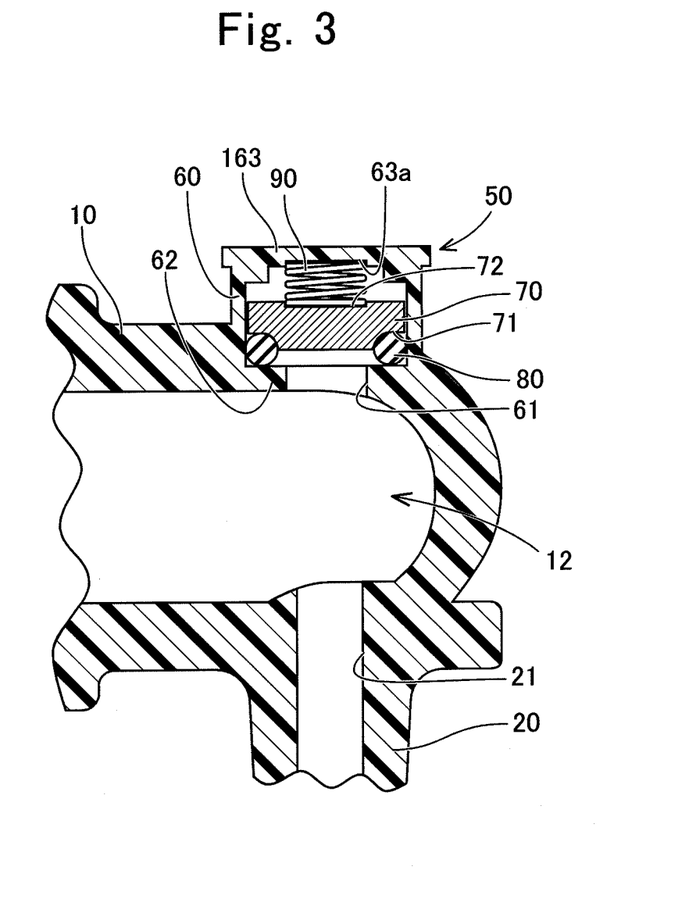
FIG. 3 is a partial longitudinal sectional view of a connector of Example 2 of the present invention and corresponds to FIG. 2.

Next, a connector of Example 2 will be described with reference to FIG. 3. Herein, the connector of Example 2 is different from that of the above example only in a pulsation reducing member 50. Therefore, only differences will be discussed below. Same reference numbers are assigned to same or corresponding components of the above example.

The pulsation reducing member 50 of this example is different from the pulsation reducing member 50 of Example 1 only in not having the bottom side opening portion 64 of the cylinder 60. That is to say, a bottom portion 163 of a cylinder 60 forms a closed bottom surface. The other components are common between both the examples.

That is to say, the cylinder 60, a piston 70 and an elastic sealing member 80 form a sealed chamber in a region in the cylinder 60 on a side of the piston 70 opposite to a passage 12. Gas such as the air is sealed in this chamber. Then, the air in the sealed chamber serves as an urging body in addition to the urging elastic member 90. Tuning of frequency of pulsation is carried out by adjusting pressure of the air sealed in the sealed chamber in addition to adjusting a coil spring as the urging elastic member 90.

Moreover, upon making the region on the side of the piston 70 opposite to the passage 12 into a sealed chamber, fluid fuel can be prevented from leaking outside even if passed through the elastic sealing member 80. In this way, the connector 1 can have a fail-safe function against fluid fuel leakage.

Example 3

Figure 4:
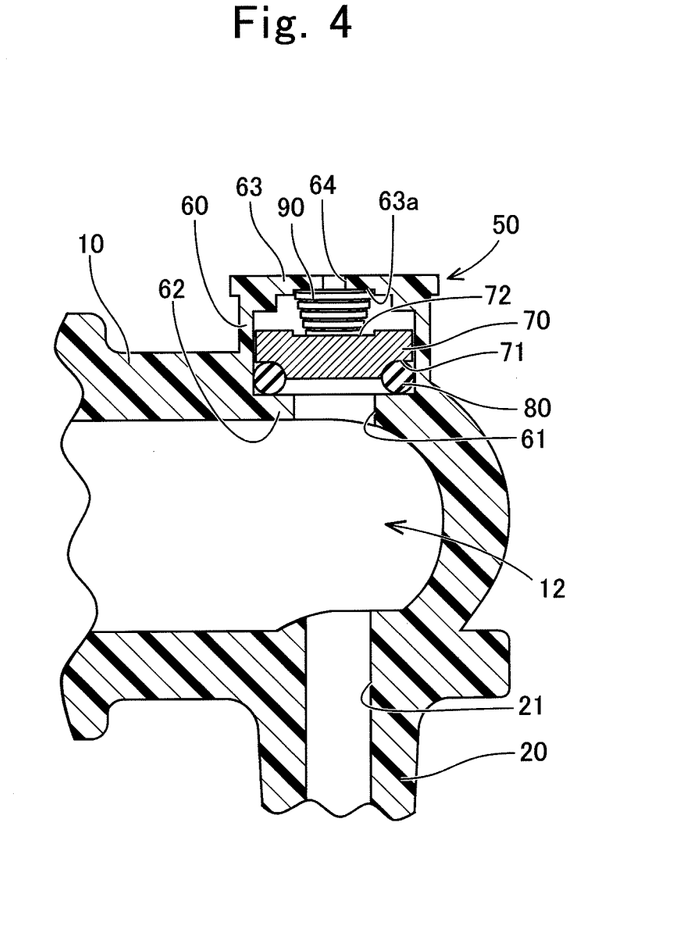
FIG. 4 is a partial longitudinal sectional view of a connector of Example 3 of the present invention and corresponds to FIG. 2.

Next, a connector 1 of Example 3 will be described with reference to FIG. 4. A pulsation reducing member 50 of this example is different from the pulsation reducing member 50 of Example 1 in an urging elastic member 90. A plurality of flat springs are used as the urging elastic member 90 of this example. The flat springs are layered and sandwiched between a bottom portion 63 of a cylinder 60 and a circular recessed portion 72 of a piston 70. Since the flat springs have high moduli of repulsion elasticity like a coil spring, the flat springs exhibit similar effects to those of the coil spring.

Herein, the respective flat springs are formed in slightly curved shapes. The respective flat springs have different sizes so as to form a stepped shape as they approach from a side of the bottom portion 63 of the cylinder 60 toward a circular recessed portion 72 of the piston 70 in order to prevent the respective flat springs when layered from being misaligned from each other.

Example 4

Figure 5:
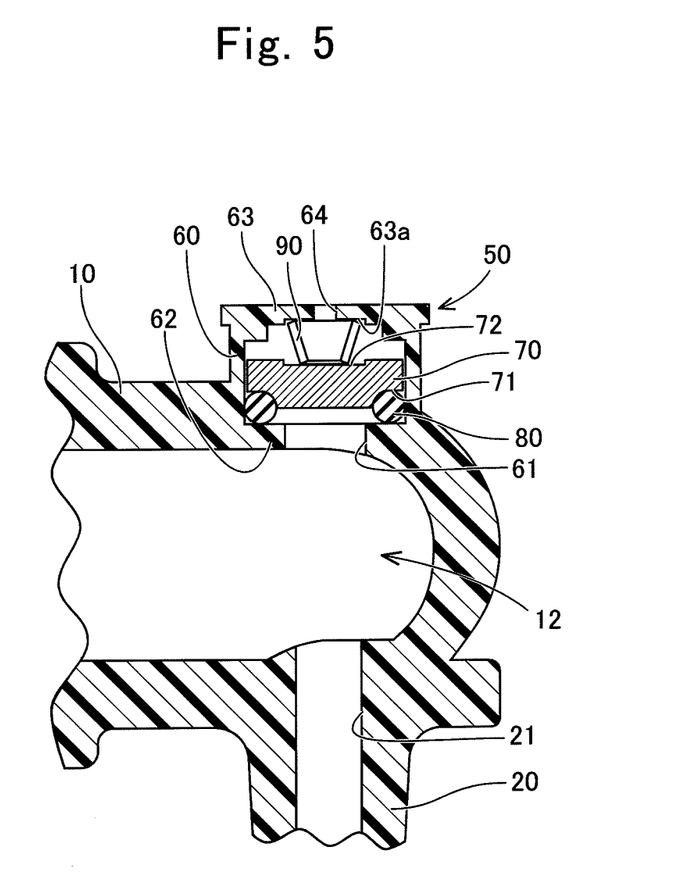
FIG. 5 is a partial longitudinal sectional view of a connector of Example 4 of the present invention and corresponds to FIG. 2.

Next, a connector 1 of Example 4 will be described with reference to FIG. 5. A pulsation reducing ember 50 of this example is different from the pulsation reducing member 50 of Example 3 in an urging elastic member 90. One flat spring having a circular truncated cone shape is used as the urging elastic member 90. The flat spring is sandwiched between a bottom portion 63 of a cylinder 60 and a circular recessed portion 72 of a piston 70. Since the flat spring has a high modulus of repulsion elasticity like a coil spring, the flat spring exhibits similar effects to those of the coil spring.

Example 5

Figure 6:
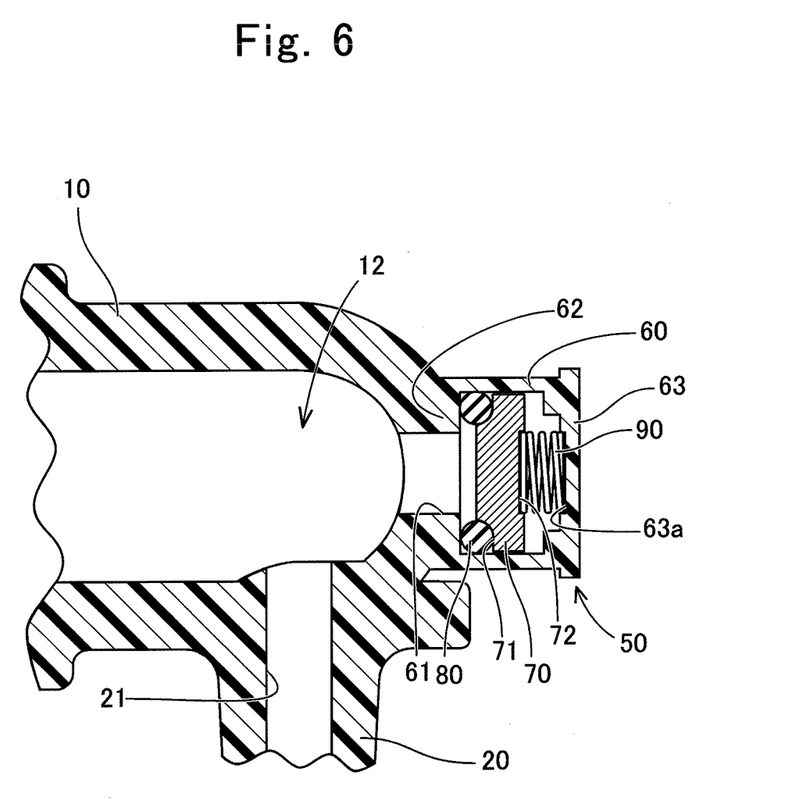
FIG. 6 is a partial longitudinal sectional view of a connector of Example 5 of the present invention and corresponds to FIG. 2.

Next, a connector 1 of Example 5 will be described with reference to FIG. 6. A pulsation reducing member 50 of this example is different from the pulsation reducing member 50 of Example 2 in a fixed position on a housing 10 and a direction to face the housing 10.

In Example 2, the axial direction of the hollow cylindrical shape of the cylinder 60 is aligned with the axial hole 21 of the hose connecting portion 20. In this example, however, a cylinder 60 is integrally formed with the housing 10 in such a manner that an axial direction of a hollow cylindrical shape of the cylinder 60 is aligned with an axial direction of the housing 10. In this case, too, the pulsation reducing member 50 exhibits similar effects to those of the above examples.

Example 6

Figure 7:
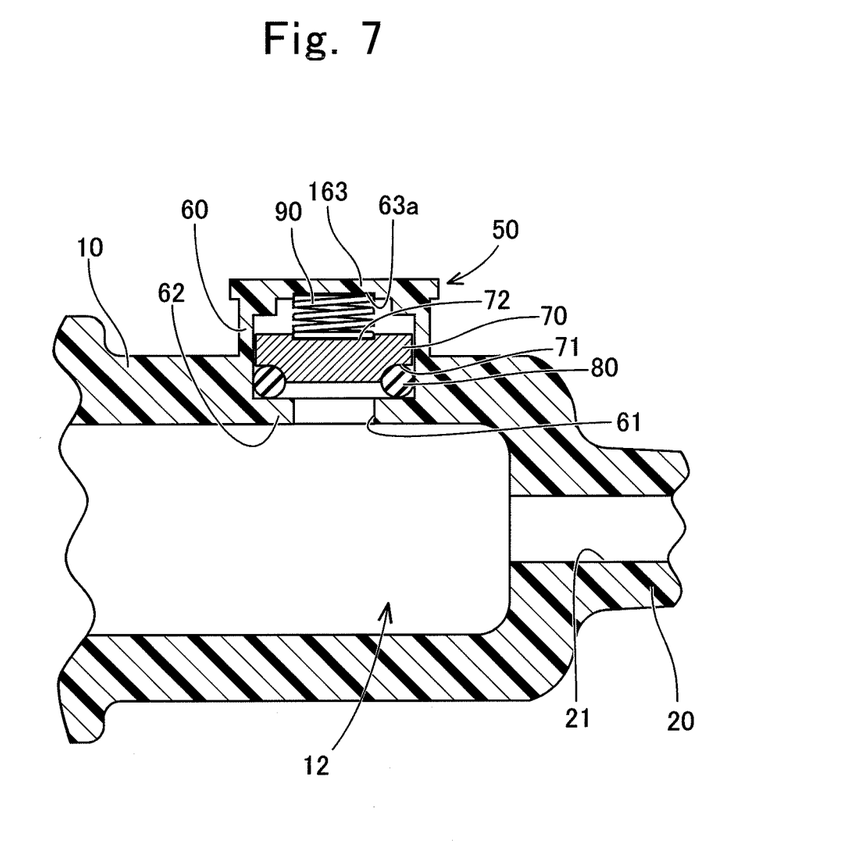
FIG. 7 is a partial longitudinal sectional view of a connector of Example 6 of the present invention and corresponds to FIG. 2.

Next, a connector 1 of Example 6 will be described with reference to FIG. 7. The connector 1 of this example is a straight type connector. That is to say, an axial direction of a housing 10 is aligned with an axial direction of a hose connecting portion 20. At this time, a pulsation reducing member 50 is provided on a side of a housing 10 near the hose connecting portion 20. The pulsation reducing member 50 of this example is the same as that of Example 2, but can be the pulsation reducing members 50 of other examples.

Others

In addition to the above examples, elastic resin can be used in place of the coil spring or the one or more flat springs as an urging elastic member 90. Examples of the elastic resin include thermoplastic elastomer olefin, thermoplastic elastomer ester, thermoplastic elastomer polyamide, thermoplastic elastomer vinyl chloride, thermoplastic elastomer polyurethane, and silane cross-linked resin. Elastic resin have a smaller elastic deformation volume than a coil spring or a flat spring, but exhibits similar effects to those of the coil spring or the like when deformed within its elastically deformable range.

Moreover, rubber can be used as an urging elastic member 90. Rubber, i.e., a viscoelastic body can not only exhibit repulsion force owing to its elastic component but also absorb displacement energy of the piston 70 owing to its viscous component. Therefore, pulsation can be reduced by the energy absorption effect.

Furthermore, in Example 2, the urging body is constituted by the coil spring as the urging elastic member 90 and the air in the sealed chamber. In this case, it is possible to exclude the urging elastic member 90 and use only the air in the sealed chamber as the urging body. In this case, too, pulsation can be reduced by repulsion force of the air.

What is claimed is:

1. A connector, comprising:
a housing forming a passage for conveying fluid from one end to the other end thereof, and connecting a first member on a side of the one end with a second member on a side of the other end; and
a pulsation reducing member provided on the housing;
the pulsating reducing member comprising:
a cylinder formed in a hollow cylindrical shape integrally with the housing, having an opening portion on one end side of the hollow cylindrical shape communicating with the passage, and having an annular flange portion projecting in a radially inner direction of the hollow cylindrical shape;
a piston disposed in the cylinder on a side of the flange portion opposite to the passage and movable in the cylinder;
an elastic sealing member sandwiched in a compressed state between an end surface of the flange portion and an end surface of the piston, dividing a region on a side of the piston near the passage from a region on a side of the piston opposite to the passage in the cylinder, and changing in amount of compression in accordance with position of the piston; and
an urging body disposed in the region on the side of the piston opposite to the passage in the cylinder and applying urging force to move the piston toward the passage and compress the elastic sealing member,
wherein the elastic sealing member is formed of a material and shape which enables elastic deformation at least in an amount corresponding to a travel distance of the piston.

2. The connector according to claim 1, wherein the urging body comprises an elastic member which is any of rubber, a coil spring, a flat spring and elastic resin attached between the other end surface of the piston and a surface on the other end side of the cylinder.

3. The connector according to claim 2, wherein the cylinder has an opening portion on the other end side of the hollow cylindrical shape, and
the region in the cylinder on the side of the piston opposite to the passage is open to the atmosphere.

4. The connector according to claim 2, wherein the cylinder has a closed bottom surface on the other end side of the hollow cylindrical shape,
the cylinder, the piston and the elastic sealing member form a sealed chamber in the region in the cylinder on the side of the piston opposite to the passage, and
the urging body comprises gas in the sealed chamber in addition to the elastic member.

5. The connector according to claim 1, wherein the cylinder has a closed bottom surface on the other end side of the hollow cylindrical shape,
the cylinder, the piston and the elastic sealing member form a sealed chamber in the region in the cylinder on the side of the piston opposite to the passage, and
the urging body is gas in the sealed chamber.

6. The connector according to claim 1, wherein the elastic sealing member is always sandwiched in a compressed state between an end surface of the flange portion and an end surface of the piston; and
wherein the elastic sealing member always restricts fluid transfer between the region on the side of the piston near the passage and the region on the side of the piston opposite to the passage in the cylinder.

* * * * *